United States Patent [19]

Kohda

[11] Patent Number: 4,642,712
[45] Date of Patent: Feb. 10, 1987

[54] AUTOMATIC TAPE LOADING TYPE RECORDING AND/OR REPRODUCING APPARATUS HAVING A PLURALITY OF MODES

[75] Inventor: Kazuo Kohda, Yokohama, Japan

[73] Assignee: Victor Company of Japan, Ltd., Yokohama, Japan

[21] Appl. No.: 580,897

[22] Filed: Feb. 16, 1984

[30] Foreign Application Priority Data

Feb. 28, 1983 [JP] Japan ................................. 58-33475
Mar. 7, 1983 [JP] Japan ............................. 58-32569[U]
Mar. 7, 1983 [JP] Japan ............................. 58-32570[U]

[51] Int. Cl.⁴ ..................... G11B 5/027; G11B 5/008; G11B 15/00; G11B 17/00
[52] U.S. Cl. ......................................... 360/85; 360/95
[58] Field of Search ..................... 360/83, 84, 85, 95, 360/96.3

[56] References Cited

U.S. PATENT DOCUMENTS

| | | | |
|---|---|---|---|
| 3,911,491 | 9/1975 | Terao | 360/85 |
| 4,075,670 | 2/1978 | Namoto et al. | 360/85 |
| 4,121,267 | 9/1978 | Hayashi | 360/85 |
| 4,499,513 | 2/1985 | Umeda | 360/85 |

FOREIGN PATENT DOCUMENTS

| | | |
|---|---|---|
| 0057921 | 8/1982 | European Pat. Off. . |
| 2935513 | 3/1980 | Fed. Rep. of Germany . |
| 2220031 | 4/1981 | Fed. Rep. of Germany . |
| 57-130258 | 8/1982 | Japan . |
| 58-141463 | 8/1983 | Japan . |
| 2094542 | 9/1982 | United Kingdom . |
| 2096817 | 10/1982 | United Kingdom . |

Primary Examiner—Robert S. Tupper
Assistant Examiner—Melissa J. Koval
Attorney, Agent, or Firm—Louis Bernat

[57] ABSTRACT

An automatic tape loading type recording and/or reproducing apparatus comprises a guide drum having heads for recording and/or reproducing an information signal onto and/or from a tape, a guide mechanism for guiding the tape around a peripheral surface of the guide drum, a ring-shaped body disposed to generally encompass the guide drum in a plan view, for moving the guide mechanism in one direction up to a predetermined position from an original position by undergoing a rotation to a second position from a first position, and for moving the guide mechanism in a direction opposite to the one direction back to the original position from the predetermined position by undergoing a rotation to the first position from the second position, a moving mechanism for moving the tape in a predetermined tape path, a braking mechanism for braking a supply and take-up reel discs over which reels of a tape cassette are fitted, a first control mechanism operated by the ring-shaped body which rotates, for controlling the moving mechanism so that it assumes a state in correspondence with a set mode of the apparatus, and a second control mechanism operated by the ring-shaped body which rotates, for controlling the braking mechanism so that it assumes a state in correspondence with the set mode of the apparatus.

8 Claims, 10 Drawing Figures

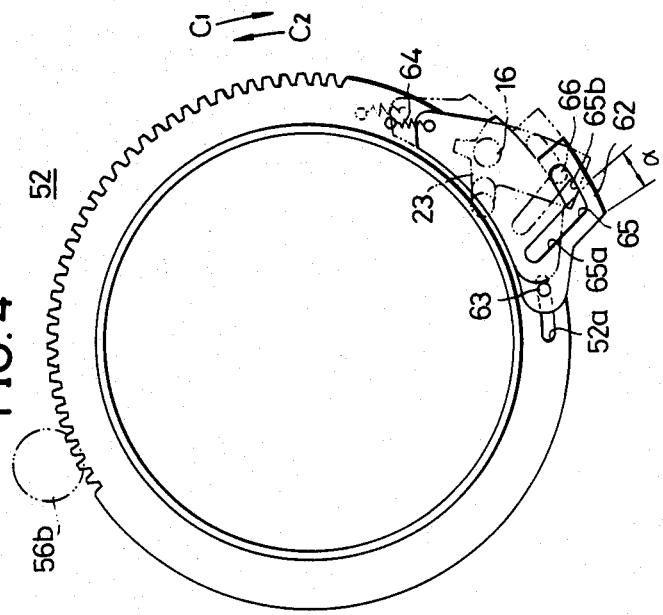
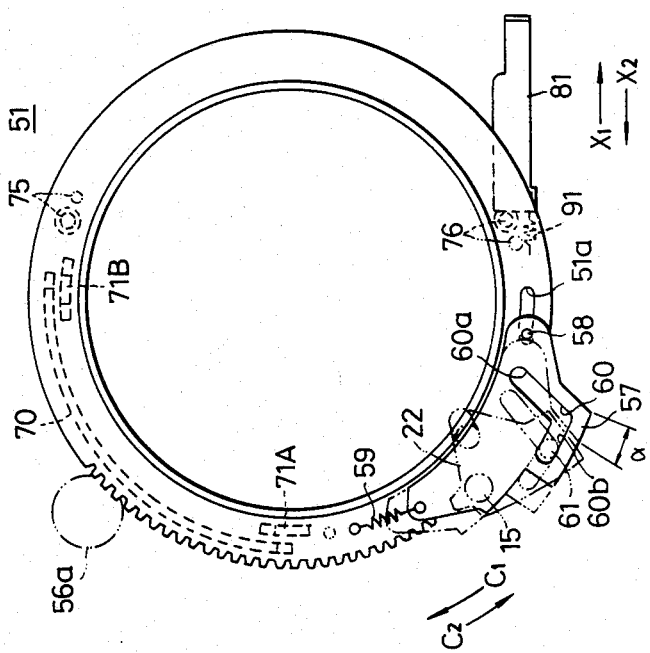

AUTOMATIC TAPE LOADING TYPE RECORDING AND/OR REPRODUCING APPARATUS HAVING A PLURALITY OF MODES

BACKGROUND OF THE INVENTION

The present invention generally relates to automatic tape loading type recording and/or reproducing apparatuses, and more particularly to an automatic tape loading type recording and/or reproducing apparatus which is designed so that a tape driving system and a reel disc braking system are operated by use of the rotation of ring-shaped bodies which carry out the tape loading operation.

Presently, automatic tape loading type recording and/or reproducing apparatuses are in wide use. In the automatic tape loading type recording and/or reproducing apparatus, a tape loading mechanism automatically draws a tape out of a tape cassette which is loaded into the recording and/or reproducing apparatus, and loads the tape in a predetermined tape path. The recording and/or reproducing apparatus comprises a tape driving system and a reel disc braking system. The tape driving system drives the tape to move along the predetermined tape path, by carrying out operations such as pressing a pinch roller against a capstan and pushing a braking roller against a take-up reel disc. On the other hand, the reel disc braking system operates a reel brake for the purpose of applying a back tension to the tape. Generally, the operations in the tape driving system and the reel disc braking system were carried out by use of driving forces of plungers. For this reason, in addition to a motor for operating the tape loading mechanism, the recording and/or reproducing apparatus was provided with plungers for operating the tape driving system and the reel disc braking system. Further, because of the loads which are associated with the operations of the tape driving system and the reel disc braking system, relatively bulky and heavy plungers had to be employed. As a result, there were disadvantages in that the overall size and weight of the recording and/or reproducing apparatus became large and heavy.

SUMMARY OF THE INVENTION

Accordingly, it is a general object of the present invention to provide a novel and useful automatic tape loading type recording and/or reproducing apparatus in which the above described disadvantages have been eliminated.

Another and more specific object of the present invention is to provide an automatic tape loading type recording and/or reproducing apparatus which is designed so that a tape driving system and a reel disc braking system are operated by use of the rotation of ring-shaped bodies which carry out the tape loading operation. According to the apparatus of the present invention, it is unnecessary to provide plungers for operating the tape driving system and the reel disc braking system. As a result, it becomes possible to effectively downsize and reduce the weight of the apparatus, and also reduce the manufacturing cost of the apparatus. Furthermore, according to the apparatus of the present invention, members for controlling the operation of the tape driving system and members for controlling the operation of the reel disc braking system can respectively be disposed within a large space without difficulties, due to the fact that the diameters of the ring-shaped bodies are generally large. Moreover, it is possible to set rotational positions of the ring-shaped bodies with a satisfactory precision. Therefore, it is possible to stably operate the tape driving system and the reel disc braking system with an accurate timing, and the reliability of the apparatus is consequently improved.

Other objects and further features of the present invention will be apparent from the following detailed description when read in conjunction with the accompanying drawings.

BRIEF DESCRIPTION OF THE DRAWINGS

FIGS. 3 and 4 are plan views respectively showing a first loading ring and a second loading ring in the stop mode;

DETAILED DESCRIPTION

Figure 1:
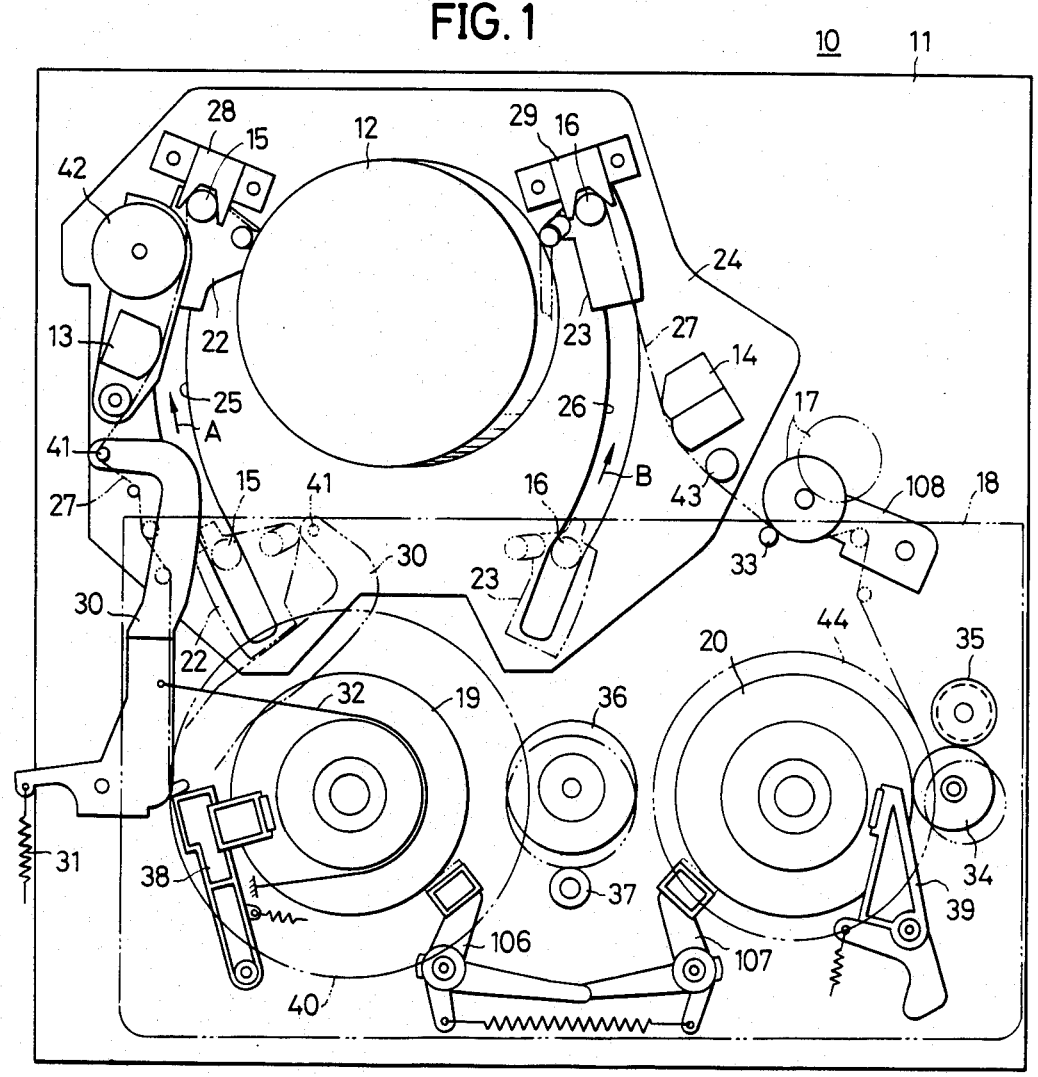
FIG. 1 is a plan view showing an embodiment of an automatic tape loading type recording and/or reproducing apparatus according to the present invention, in a recording or reproducing mode.

As shown in FIG. 1, an automatic tape loading type recording and/or reproducing apparatus 10 comprises a main chassis 11. A guide drum 12, a full-width erasing head 13, an audio and control head 14 and the like are disposed on the main chassis 11. The guide drum 12 is made up from an upper rotary drum which has rotary video heads, and a lower stationary drum. In a stop mode of the apparatus 10, loading poles 15 and 16 and a pinch roller 17 assume respective positions which are indicated by two-dot chain lines in FIG. 1. As indicated by a two-dot chain line in FIG. 1, a tape cassette 18 is loaded into the apparatus 10 in a state where reels (not shown) inside the tape cassette 18 are respectively fitted over a supply reel disc 19 and a take-up reel disc 20.

When the apparatus 10 is operated to start a recording or reproduction, a tape loading mechanism 50 operates as will be described later on in the specification. The tape loading mechanism 50 will be described in detail later on in the specification by referring to FIG. 2. When the tape loading mechanism 50 operates, loading pole bases 22 and 23 move along respective guide grooves 25 and 26. The loading pole base 22 moves in the direction of an arrow A, and the loading pole base 23 moves in the direction of an arrow B. As a result, a magnetic tape 27 which is accommodated within the tape cassette 18, is intercepted by the loading poles 15 and 16 and drawn out of the tape cassette 18. The loading pole bases 22 and 23 move up to respective final positions where the loading pole 15 pushes against a stopper 28 and the loading pole 16 pushes against a stopper 29. Following this movement of the loading pole base 22, a tension arm 30 is rotated counterclockwise by a spring 31, and a tension develops in a brake band 32. In addition, in the final operation stage of the tape loading mechanism 50, the pinch roller 17 presses against a capstan 33 with the tape 27 pinched therebetween, a take-up idler 34 for taking up the tape makes pressing contact with the take-up reel disc 20 and with a driving roller 35, an idler 36 for fast-forwarding or rewinding the tape separates from a driving roller 37, and a supply brake arm 38 and a take-up brake arm 39 rotate and separate from the respective reel discs 19 and 20, as will be described later on in the specification.

After the tape loading operation is completed, the apparatus assumes a recording or reproducing mode. The tape 27 is fed out from a supply tape roll 40, and makes contact with an impedance roller 42 after making contact with a tension pole 41 and the full-width erasing head 13. The tape 27 is further guided by the loading pole 15, and is changed of its direction of path to be wrapped around the guide drum 12 in a spiral manner. A video signal is recorded onto or reproduced from the tape 27 by the rotary video heads, while the tape 27 is in contact with the guide drum 12.

After making contact with the guide drum 12, the tape 27 is guided by the loading pole 16 and is changed of its direction of path. Thereafter, the tape 27 makes contact with the audio and control head 14 and a guide roller 43. Further, the tape 27 is pinched between the pinch roller 17 and the capstan 33, and driven in this state. Thus, the tape 27 enters within the tape cassette 18, and is finally taken up by a take-up tape roll 44.

Figure 2:
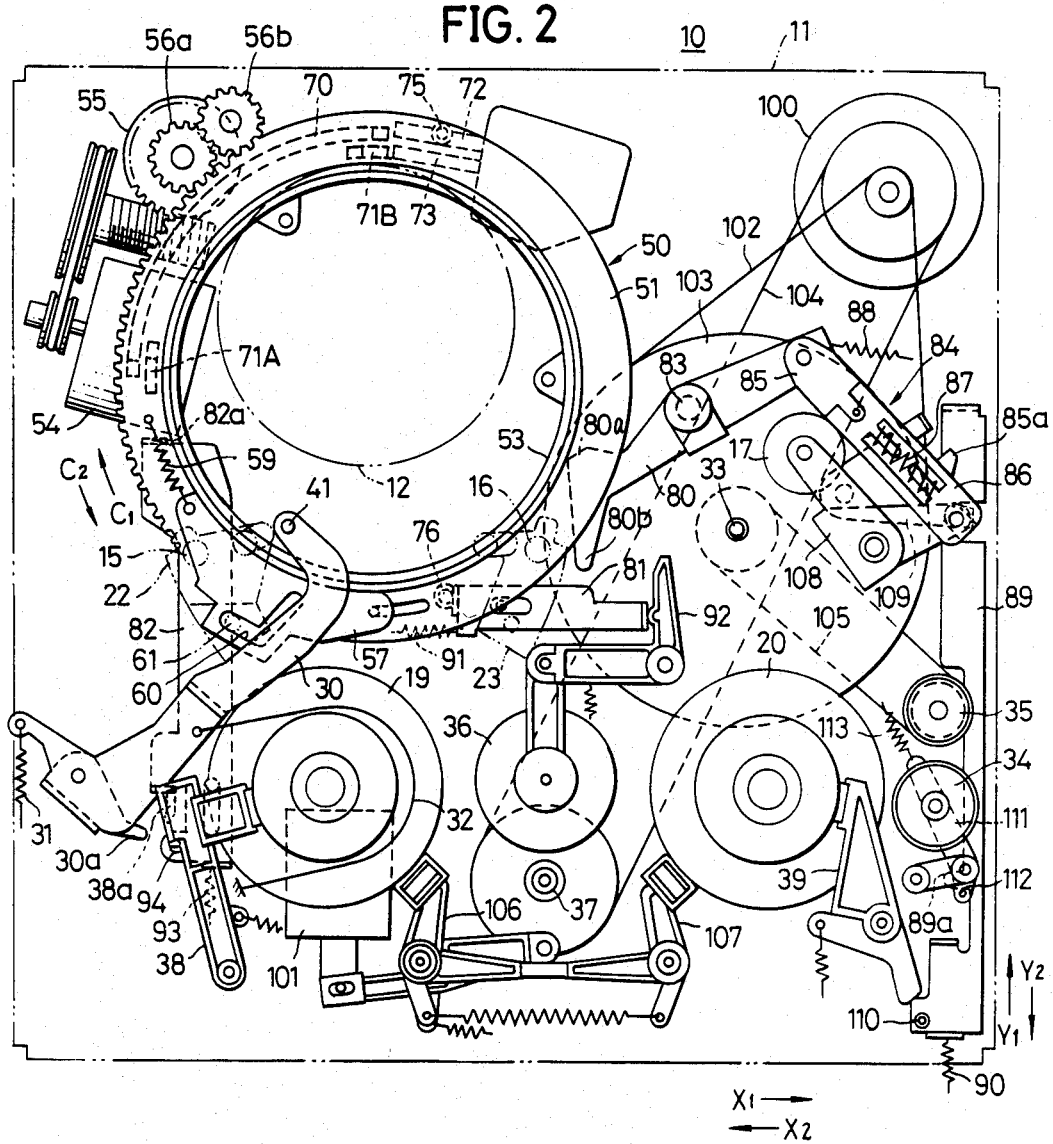
FIG. 2 is a plan view showing the operating state of a tape driving system and a reel disc braking system in a stop mode.

Next, description will be given with respect to the construction and operation of the tape loading mechanism 50 and its related parts, by referring to FIG. 2. The description will be given for each mode of the apparatus 10. FIG. 2 shows the state of the apparatus 10 in a stop mode.

The tape loading mechanism 50 generally comprises a first loading ring 51 shown in FIG. 3 and a second loading ring 52 shown in FIG. 4. The first and second loading rings 51 and 52 are concentrically fitted onto a cylindrical bearing 53 which is secured on the chassis 11, with the second loading ring 52 on top of the first loading ring 51. In FIG. 2 and FIGS. 7 through 9 which will be described later on in the specification, the illustration of the second loading ring 52 is omitted for convenience' sake. When a loading motor 54 rotates in a forward direction, the first loading ring 51 is rotated in the direction of an arrow C1 by way of a worm gear mechanism 55 and a first driving gear 56a. Further, the second loading ring 52 is rotated in the direction of the arrow C2 by way of a second driving gear 56b. On the other hand, when the loading motor 54 rotates in a reverse direction, the first loading ring 51 is rotated in the direction of the arrow C2 and the second loading ring 52 is rotated in the direction of the arrow C1.

A slide plate 57 is mounted on the first loading ring 51 as shown in FIG. 3. A pin 58 which is located on one end of the slide plate 57, fits into an elongated hole 51a in the first loading ring 51. The slide plate 57 is mounted on the first loading ring 51, in a state where the slide plate 57 is urged to move in the direction of the arrow C1 by a spring 59. The slide plate 57 comprises an L-shaped elongated hole 60 which is made up from an elongated hole portion 60a which extends in the diametral direction of the first loading ring 51 and an elongated hole portion 60b which extends in the circumferential direction of the first loading ring 51. A downwardly extending pin 61 of the loading pole base 22 fits into the elongated hole 60, thereby coupling the slide plate 57 (first loading ring 51) and the loading pole base 22.

As shown in FIG. 4, a slide plate 62 is mounted on the second loading ring 52, similarly as in the case of the first loading ring 51. A pin 63 which is located on one end of the slide plate 62, fits into an elongated hole 52a in the second loading ring 52. The slide plate 62 is mounted on the second loading ring 52, in a state where the slide plate 62 is urged to move in the direction of the arrow C2 by a spring 64. An elongated hole 65 made up from an elongated hole portion 65a which extends in the diametral direction of the second loading ring 52 and an elongated hole portion 65b which extends in the circumferential direction of the second loading ring 52, is formed in the slide plate 62. A downwardly extending pin 66 of the loading pole base 23 fits into the elongated hole 65, thereby coupling the slide plate 62 (second loading ring 52) and the loading pole base 23.

Figure 5A:
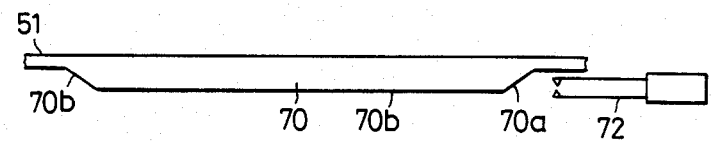
FIGS. 5A and 5B respectively show a cam which is formed on the bottom of the first loading ring, in a form of a development together with a detecting switch.
Figure 5B:
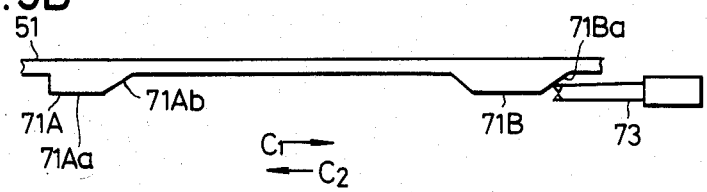

An arcuate rib-shaped cam 70 shown in FIG. 5A, is formed on the bottom of the first loading ring 51, closer to the outer periphery of the first loading ring 51. Further, rib-shaped cams 71A and 71B shown in FIG. 5B, are formed on the bottom of the first loading ring 51, closer to the inner periphery of the first loading ring 51. A detecting switch 72 is mounted on the chassis 11 in correspondence with the cam 70, and a detecting switch 73 is mounted on the chassis 11 in correspondence with the cams 71A and 71B. The detecting switch 72 is turned ON when it is pushed by the cam 70, and the detecting switch 73 is turned ON when it is pushed by the cam 71A or 71B. The detecting switches 72 and 73 are coupled to a control circuit (not shown) which controls the loading motor 54.

The detecting switch 72 detects the rotational position of the first loading ring 51 when the first loading ring 51 rotates in the direction of the arrow C1. In other words, a fast-forward mode position of the first loading ring 51 during a fast-forward mode is detected when a sloping surface 70a of the cam 70 pushes the detecting switch 72 and accordingly turns the detecting switch 72 ON. As the first loading ring 51 undergoes a further rotation, the detecting switch 72 is constantly pushed by a bottom surface 70b of the cam 70, and the detecting switch 72 remains ON. As the first loading ring 51 undergoes still a further rotation and a sloping surface 70c of the cam 70 opposes the detecting switch 72, the detecting switch 72 is no longer pushed by the cam 70. As a result, the detecting switch 72 is turned OFF, and a reproducing mode position of the first loading ring 51 during the reproducing (play) mode is detected.

The other detecting switch 73 detects the position of the first loading ring 51 when the first loading ring 51 rotates in the direction of the arrow C2 from the reproducing mode position. When the first loading ring 51 assumes the reproducing mode position, the detecting switch 73 is pushed by a bottom surface 71Aa of the cam 70A and is turned ON. When the first loading ring 51 rotates in the direction of the arrow C2 and a sloping surface 71Ab of the cam 70A opposes the detecting switch 73, the detecting switch 73 is no longer pushed by the cam 70A. As a result, a search mode position of the first loading ring 51 during a search mode is detected. In addition, as the first loading ring 51 undergoes a further rotation, the cam 71B pushes the detecting switch 73 and turns the detecting switch 73 ON. As the first loading ring 51 undergoes still a further rotation, a sloping surface 71Ba of the cam 71B opposes the detecting switch 73 as shown in FIG. 5B. In this state, the detecting switch 73 is no longer pushed by the cam 70B, and the detecting switch 72 is turned OFF. Hence, a stop mode position of the first loading ring 51 during a stop mode is detected.

Because the diameter of the first loading ring 51 is relatively large such that the periphery of the first loading ring 51 surrounds the guide drum 12, the cams 70, 71A, and 71B are disposed to the outside of the guide drum 12. For this reason, the rotational positions of the first loading ring 51 during the various modes can be set with a satisfactory precision.

Figure 6:
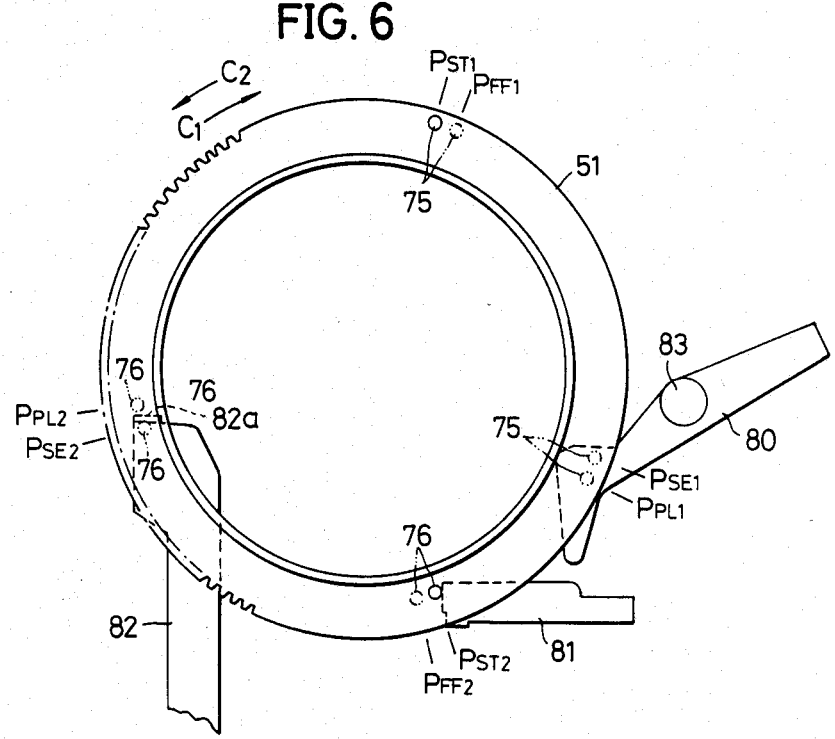
FIG. 6 shows positions of first and second operating pins on the first loading ring in each of the modes, together with braking members which are disposed in the periphery of the first loading ring.
Figure 7:
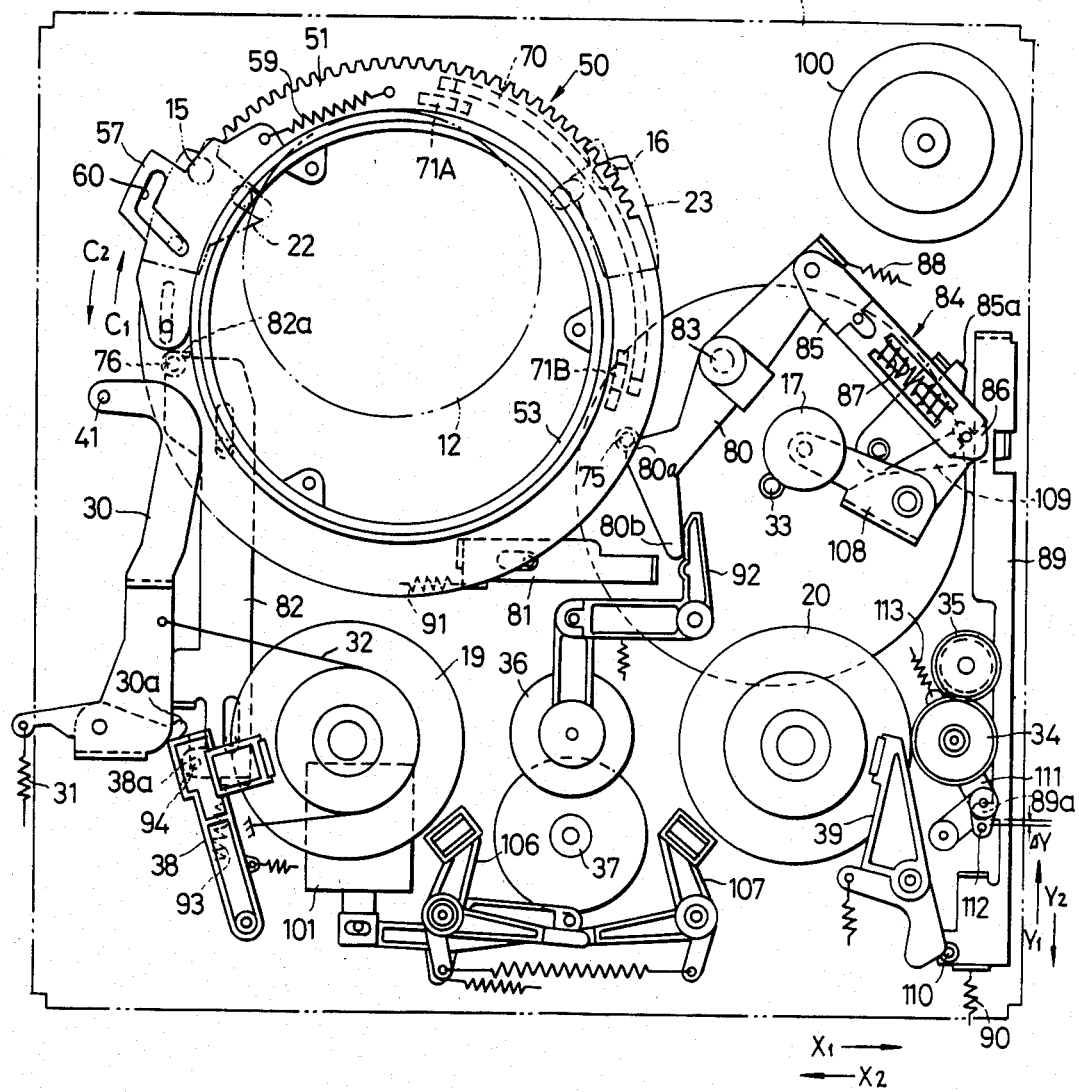
FIG. 7 is a plan view showing the operating state of the tape driving system and the reel disc braking system in a recording or reproducing mode.
Figure 8:
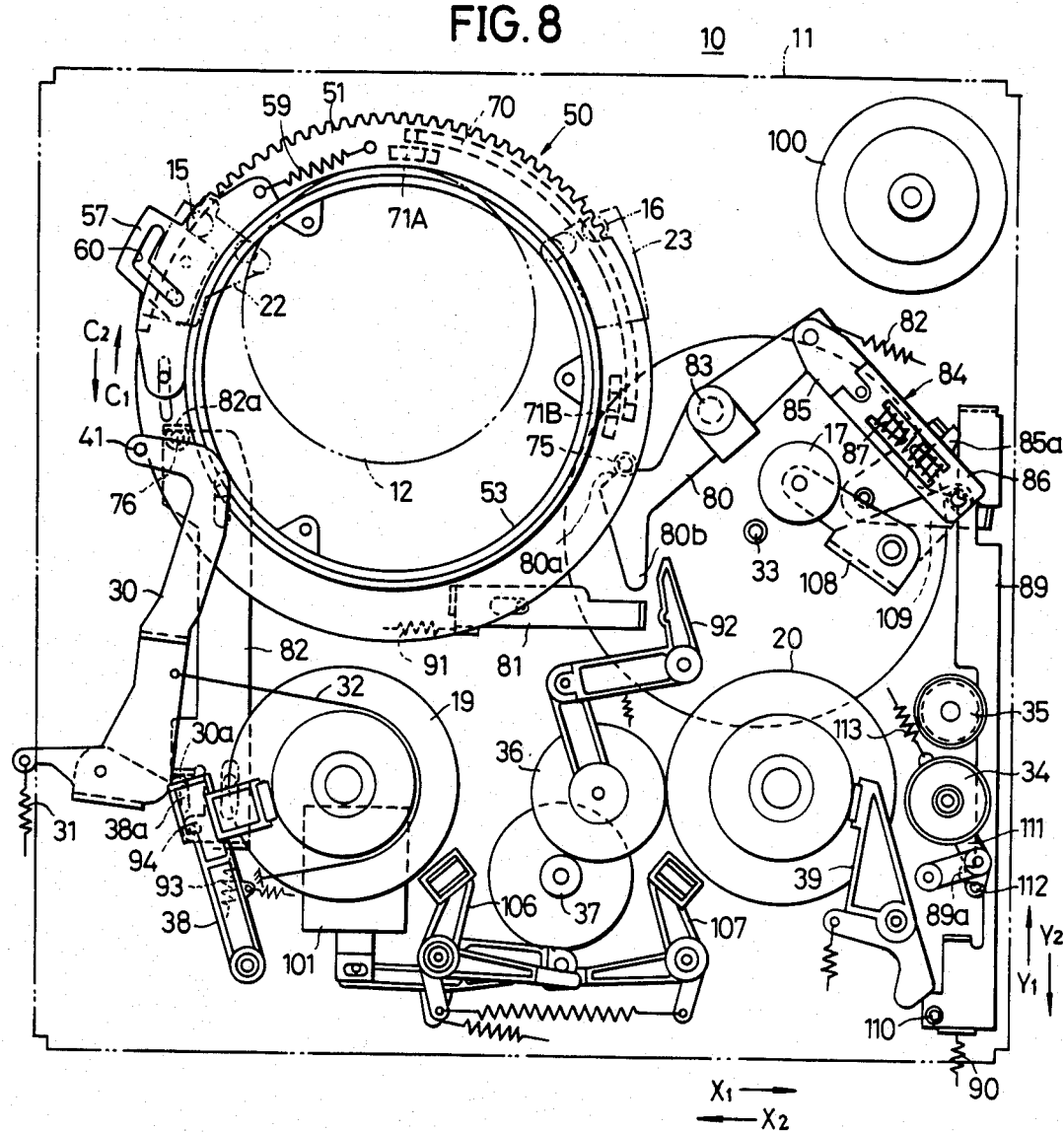
FIG. 8 is a plan view showing the operating state of the tape driving system and the reel disc braking system in a search mode.
Figure 9:
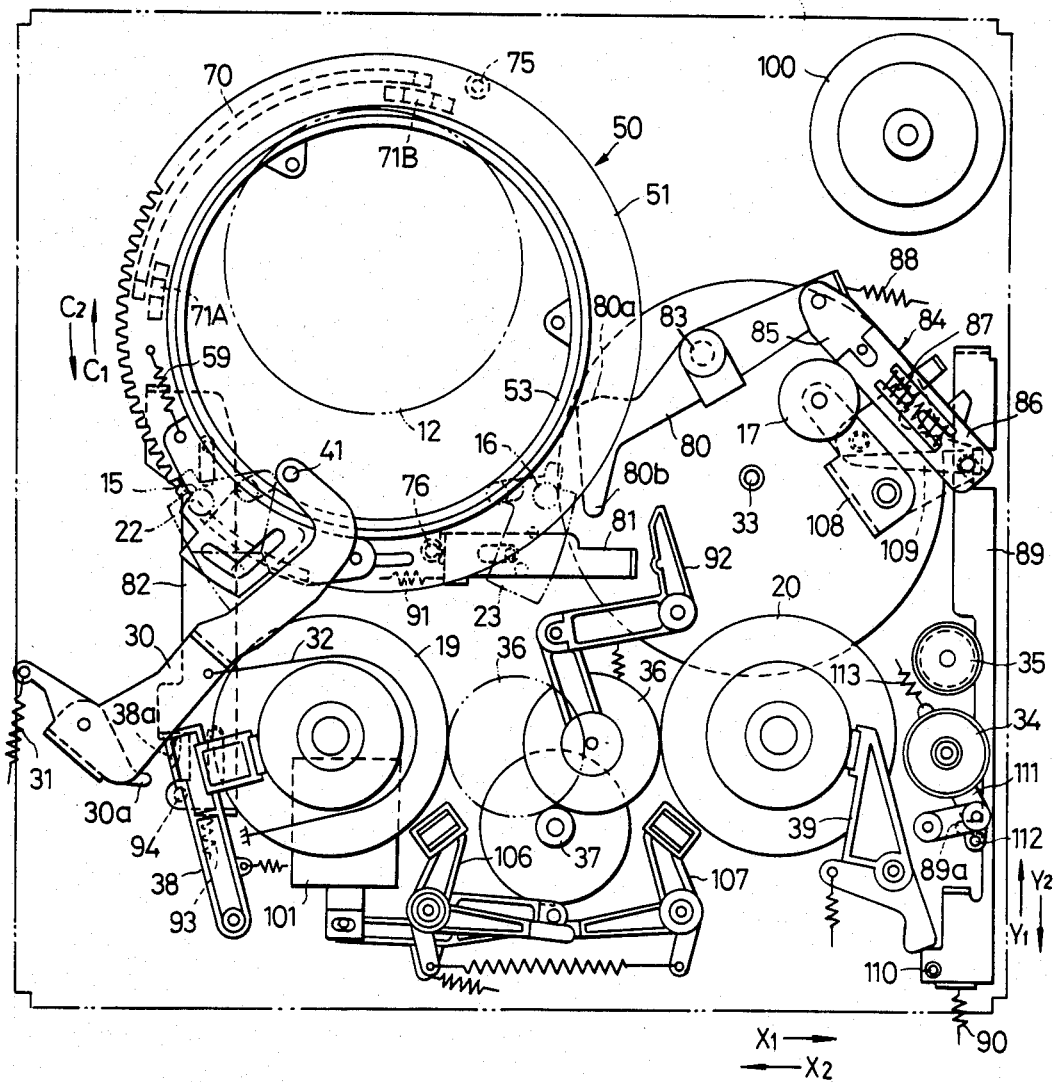
FIG. 9 is a plan view showing the operating state of the tape driving system and the reel disc braking system in a fast-forward mode.

A first operating pin 75 for operating a pinch roller operating mechanism and the like, and a second operating pin 76 for controlling the operation of the idler 36 which fast-forwards or rewinds the tape and the operation of the supply brake arm 38, are embeddedly located on the bottom of the first loading ring 51. FIG. 6 shows the rotational positions of the first loading ring 51 during the various modes, in terms of the positions of the operating pins 75 and 76. In FIG. 6, positions $P_{ST1}$, $P_{FF1}$, $P_{SE1}$, and $P_{PL1}$ respectively represent rotational positions of the first operating pin 75 during the stop mode, the fast-forward mode, the search mode, and the reproducing (play) mode. On the other hand, positions $P_{ST2}$, $P_{FF2}$, $P_{SE2}$, and $P_{PL2}$ respectively represent rotational positions of the second operating pin 76 during the stop mode, the fast-forward mode, the search mode, and the reproducing (play) mode.

As shown in FIGS. 2 and 6, a rotary arm 80 and slide plates 81 and 82 are respectively supported on the chassis 11, adjacent the periphery of the first loading ring 51. Since the diameter of the first loading ring 51 is greater than the diameter of the guide drum 12, there is sufficient space for disposing the rotary arm 80 and the slide plates 81 and 82. In other words, no difficulties will be encountered in disposing the rotary arm 80 and the slide plates 81 and 82.

The rotary arm 80 is pivotally supported by a pin 83. One end of the rotary arm 80 is coupled to a slide plate 85 of a pinch roller operating arm assembly 84 which comprises a pair of slide plates 85 and 86 and a compressed coil spring 87 which is inserted between the slide plates 85 and 86. During the stop mode, the rotary arm 80 is rotated clockwise by a spring 88 which acts on one end of the rotary arm 80. A cam 80a which is formed on the other end of the rotary arm 80, enters within a rotational locus of the first operating pin 75 of the first loading ring 51. In addition, when the rotary arm 80 is in this rotational position, the pinch roller 17 is separated from the capstan 33. Moreover, a slide plate 89 is moved in the direction of an arrow Y2 by a spring 90, and the take-up idler 34 is separated from the capstan 33. In this state, the brake arm 39 pushes against the reel disc 20.

The slide plate 81 is provided slidable in the directions of arrows X1 and X2, and is urged to move in the direction of the arrow X2 by a spring 91. During the stop mode, the left end of the slide plate 81 is engaged with the second operating pin 76 which assumes the position $P_{ST2}$, and the slide plate 81 is moved in the direction of the arrow X1. Accordingly, an L-shaped arm 92 is pushed by the right end of the slide plate 81, and is rotated clockwise. In this state, the idler 36 is separated from the driving roller 37.

The slide plate is provided slidable in the directions of the arrows Y1 and Y2, and is urged to mode in the direction of the arrow Y2 by a spring 93. During the stop mode, the slide plate 82 is moved in the direction of the arrow Y2. Thus, a pin 94 separates from a cam portion 38a of the brake arm 38, and the brake arm 38 pushes against the reel disc 19. An upper bent part 82a of the slide plate 82 assumes a position within a rotational locus of the second operating pin 76.

When the apparatus 10 is operated to start the recording or reproduction, the loading motor 54 starts to rotate in the forward direction, a motor 100 starts to rotate in the forward direction, and a compact plunger 101 is operated.

A flywheel 103 and the capstan 33 are rotated by the motor 100 by way of a belt 102. The driving roller 37 is rotated by the motor 100 by way of a belt 104. Further, the driving roller 35 are rotated by the motor 100 by way of the flywheel 103 and a belt 105. When the plunger 101 operates, main brake arms 106 and 107 rotate and separate from the respectively reel discs 19 and 20.

When the loading motor 54 rotates in the forward direction, the first loading ring 51 rotates in the direction of the arrow C1 until the detecting switch 72 detects the reproducing mode position of the first loading ring 51, while the second loading ring 52 rotates in the direction of the arrow C2 up to a final position. By these rotations of the first and second loading rings 51 and 52, the loading pole 15 moves in the direction of the arrow A and the loading pole 16 moves in the direction of the arrow B. The loading poles 15 and 16 move up to the respective positions which are indicated in solid lines in FIG. 1 and in two-dot chain lines in FIG. 7, to carry out the tape loading operation. The operating pins 75 and 76 move to the respectively positions $P_{PL1}$ and $P_{PL2}$ shown in FIG. 6. Hence, the apparatus 10 assumes the state shown in FIGS. 1 and 7, as will be described hereinafter.

The slide plate 81 slides in the direction of the arrow X2 and the idler 36 makes contact with the driving roller 37, due to the initial movement of the second operating pin 76. Thereafter, this idler 36 again separates from the driving roller 37 as will be described hereinafter.

In the final rotating stage of the first loading ring 51, the first operating pin 75 pushes the rotary arm 80, and the second operating pin 76 pushes the slide plate 82. In other words, the first operating pin 75 pushes the cam 80a of the rotary arm 80, and rotates the rotary arm 80 counterclockwise. Due to this counterclockwise rotation of the rotary arm 80, a pinch roller support arm 108 is pulled and rotated counterclockwise by the arm assembly. 84, and the pinch roller 17 presses against the capstan 33. Further, a V-shaped arm 109 is engaged and rotated counterclockwise by an engaging arm 85a of the slide plate 85, and the slide plate 89 slides in the direction of the arrow Y1 against the force exerted by the spring 90. When the slide plate 89 slides, the brake arm 39 is engaged and rotated by a pin 110, and separates from the reel disc 20. In addition, by the above sliding movement of the slide plate 89, an engaging piece 89a of the slide plate 89 separates from a pin 112 of an idler support arm 111, and the take-up idler 34 is pulled and moved by a spring 113 so as to push against the reel disc 20 and the drive roller 35. Accordingly, the braking with respect to the take-up reel disc 20 is released, and the take-up reel disc 20 is rotated in a tape take-up direction.

Due to the above rotation of the rotary arm 80, a projecting portion 80b of the rotary arm 80 pushes the L-shaped arm 92, and the idler 36 separates from the driving roller 37.

When rotating the rotary arm 80, a relatively large side pressure acts on the first loading ring 51. However, no problems will be introduced by the relatively large side pressure, because the first loading ring 51 is supported by the cylindrical bearing 53.

Furthermore, in the final rotating stage of the first loading ring 51, the second operating pin 76 pushes the bent portion 82a of the slide plate 82 so that the slide plate 82 slides in the direction of the arrow Y1. By this sliding movement of the slide plate 82, a small arm portion 30a of the tension arm 30 which has already rotated to an intermediate position by following the movement of the loading pole base 22 is released from its locked state, and the tension arm 30 rotates up to the operating position. In addition, by the above sliding movement of the slide plate 82, the pin 94 makes contact with the cam portion 38a, and the brake arm 38 rotates counterclockwise to separate from the reel disc 19.

The braking with respect to the reel discs 19 and 20, is cancelled in the final stage of the tape loading operation. For this reason, the tape loading operation is carried out in a state where the reel discs 19 and 20 are braked by the respective brake arms 38 and 39, that is, in a state where an appropriate back tension is applied to the tape 27 which is fed out of the tape cassette 18.

The reproducing operation is carried out in the above state where the braking with respect to the reel discs 19 and 20 are cancelled. During the reproducing mode, a gap $\Delta Y$ exists between the engaging piece 89a of the slide plate 89 and the pin 112 on the idler support arm 111.

When a search operation is carried out during the reproducing mode, the loading motor 54 rotates in the reverse direction. The first loading ring 51 rotates in the direction of the arrow C2. The detecting switch 73 detects the search mode position of the first loading ring 51 when the first loading ring 51 rotates in the direction of the arrow C2 by a small angle, and the first loading ring 51 is stopped at this search mode position. The operating pins 75 and 76 move to the respective positions $P_{SE1}$ and $P_{SE2}$ shown in FIG. 6, and the apparatus 10 assumes a state shown in FIG. 8. The loading poles 15 and 16 do not move, and remain stopped by the stoppers 28 and 29.

Due to the movement of the second operating pin 76, the slide plate 82 is moved in the direction of the arrow Y2 over a small distance by the action of the spring 93. When the slide plate 82 undergoes this small sliding movement, the locking of the brake arm 38 by the pin 94 is released. As a result, the brake arm 38 rotates and pushes against the reel disc 19. In addition, the small arm portion 30a of the tension arm 30 is pushed by the slide plate 82, and the tension arm 30 is rotated clockwise by a small angle. Consequently, the brake band 32 slackens.

On the other hand, due to the movement of the first operating pin 75, the rotary arm 80 is rotated clockwise by the action of the spring 88. As the rotary arm 80 rotates, the pinch roller support arm 108 is pushed and rotated clockwise by the arm assembly 84. The pinch roller 17 thus separates from the capstan 33.

By the movement of the arm assembly 84, the V-shaped arm 109 rotates clockwise. The slide plate 89 slides in the direction of the arrow Y2 by following the rotation of the V-shaped arm 109. When the slide plate 89 slides, the engaging piece 89a engages with and pushes the pin 112 in the direction of the arrow Y2. As a result, the take-up idler 34 separates from the driving roller 35 and the reel disc 20. Further, the pin 110 separates from the brake arm 39, and the brake arm 39 pushes against the reel disc 20. In this state, because the gap $\Delta Y$ exists between the engaging piece 89a and the pin 112, it takes a time $\Delta t$ to separate the take-up idler 34 from the driving roller 35 and the reel disc 20 from the time when the slide plate 89 starts to slide. Accordingly, the take-up idler 34 is released from its operating state, with a time lag from the time when the tension pole 41 and the pinch roller 17 complete the respective movements.

Due to the above movements of the tension pole 41 and the pinch roller 17, the length of the tape path is shortened, and the tape 27 will slacken if nothing is done. However, according to the present embodiment, the take-up idler 34 remains in its operating state even while the tension pole and the pinch roller 17 move, and the take-up reel disc 20 is urged to rotate in the tape take-up direction. Accordingly, the length of the tape path which is shortened, is taken up by the take-up tape roll 44, and the tape path is constantly maintained under tension. The tape 27 which is wrapped around the peripheral surface of the guide drum 12, will remain in constant contact with the guide drum. If the tape 27 makes irregular contact with the guide drum 12, this would lead to the generation of noise at the time of the reproduction. However, such noise will not be generated according to the present embodiment, since the tape 27 will remain in constant contact with the guide drum 12.

As the rotary arm 80 rotates, the projecting portion 80b separates from the L-shaped arm 92. The idler 36 pushes against the driving roller 37, and the driving roller 37 then swings and pushes the reel disc 20 due to the rotation of the driving roller 37. As a result, the reel disc 20 rotates in the tape take up direction at a high speed. The tape 27 moves at a high speed keeping the contact with the guide drum 12, and the search operation in the forward direction is thus carried out. When the motor 100 rotates in the reverse direction, the idler 36 swings in a direction opposite to the case described above to push against the reel disc 19, and the search operation in the reverse direction is accordingly carried out. In this state, the brake arm 38 or 39 applies the back tension to the tape 27.

The mode of the apparatus 10 is changed to the search mode from the reproducing mode in a state where the tape path in the periphery of the guide drum 12 is under tension. Therefore, noise will not be generated when the mode changes to the search mode.

From the time when the apparatus 10 is operated during the reproducing mode so as to start the search operation until the search mode actually starts, the tape 27 is not driven in the state pinched between the capstan 33 and the pinch roller 17, and the load on the motor 100 reduces. Hence, in the present embodiment, the driving voltage of the motor 100 is temporarily reduced to an appropriate voltage so that the motor torque will be most suitable for taking up the slack in the tape 27, for the purpose of protecting the tape 27.

When the apparatus 10 is operated during the reproducing mode so that the apparatus 10 assumes the stop mode, the loading motor 54 rotates in the reverse direction. The loading rings 51 and 52 respectively rotate in directions opposite to the directions in which the loading rings 51 and 52 rotate during the tape loading operation. The first loading ring 51 rotates up to its original position, that is, the position where the detecting switch 73 detects the stop mode position of the first loading ring 51. The apparatus 10 thus assumes the state shown in FIG. 2.

Next, description will be given with respect to the relationship between the loading rings 51 and 52 and the loading pole bases 22 and 23, in the final stage of the tape unloading operation.

The loading pole bases 22 and 23 respectively move in the diametral direction of the loading rings 51 and 52, according to the shape of the guide grooves 25 and 26 and the like. In a state where the loading pole base 22 has returned to the terminal end position of the guide groove 25 as indicated by the two-dot chain line in FIG. 1, that is, in the state where the loading pole 15 has returned within the tape cassette 18, the loading pole base 22 and the slide plate 57 assume the state indicated by the two-dot chain line in FIG. 3. In other words, the pin 61 escapes from the elongated hole portion 60a and opposes the elongated hole portion 60b. The first loading ring 51 and the slide plate 57 rotate by an angle α before stopping, accompanying the relative movement of the pin 61 along the elongated hole portion 60b, that is, in a state where the loading pole base 22 is stationary in its original position. The first loading ring 51 and the slide plate 57 respectively rotate independently of the loading pole base 22. In the final stage of this independent rotation of the first loading ring 51 with respect to the loading pole base 22, the second operating pin 76 pushes the slide plate 81 against the force exerted by the spring 91 so that the slide plate 81 slides in the direction of the arrow X1. Then, the L-shaped arm 92 rotates clockwise. Further, the idler 36 separates from the driving roller 37, and the fast-forward or rewind mechanism assumes a non-operating state. In the final rotating stage of the first loading ring 51, the locking with respect to a cassette ejecting mechanism (not shown) is cancelled. If the locking with respect to the cassette ejecting mechanism is not cancelled, the operator must push a cassette ejecting button (not shown) of the apparatus 10 with a relatively large force so as to cancel the locking with respect to the cassette ejecting mechanism and then eject the tape cassette 18. However, since the locking with respect to the cassette loading mechanism is cancelled beforehand, the cassette ejecting button can be operated with a small force, that is, with the so-called feather touch.

When the pin 66 relatively moves within the elongated hole 65b and the loading pole base 23 returns to its final position, the second loading ring 52 rotates independently of the loading pole base 23 by the angle α before stopping as shown in FIG. 4.

When the apparatus 10 is operated to start a fast-forward operation during the stop mode of the apparatus 10 shown in FIG. 2, the loading rings 51 and 52 rotate in the respective directions of the arrows C1 and C2. When the first loading ring 51 rotates by the angle α, the detecting switch 72 detects the fast-forward mode position of the first loading ring 51, and the first loading ring 51 stops at this position. The loading rings 51 and 52 rotate independently of the respective loading pole bases 22 and 23, accompanying the relative movements of the pins 61 and 66 along the respective elongated hole portions 60b and 65b. In other words, the loading rings 51 and 52 rotate in the state where the loading poles 15 and 16 are maintained within the tape cassette 18.

Due to the rotation of the first loading ring 51, the second operating pin 76 moves up to the position indicated by the two-dot chain line in FIG. 3, from the position indicated by the solid line.

As the second operating pin 76 moves, the slide plate 81 slides in the direction of the arrow X2 due to the action of the spring 91. Hence, the locking with respect to the L-shaped arm 92 by the slide plate 81 is cancelled, and the L-shaped arm 92 rotates. The idler 36 pushes against the driving roller 37, and the idler 36 swings to push against the reel disc 20 due to the rotation of the driving roller 37. As a result, the reel disc 20 rotates in the tape take-up direction. Therefore, the tape 27 moves in the forward direction at a high speed, within the tape cassette 18, and the fast-forward operation is thus carried out.

When the apparatus 10 is operated so as to start the rewind operation, the motor 100 rotates in the reverse direction. The idler 36 swings in a direction opposite to the direction in which the idler 36 swings for the fast-forward operation, and pushes against the reel disc 19 as indicated by the two-dot chain line in FIG. 9. The reel disc 19 is rotated in the tape take-up direction. Accordingly, the tape 27 moves in the reverse direction at a high speed, within the tape cassette 18, and the rewind operating is thus carried out.

In other words, the mode of the apparatus 10 is changed to the fast-forward or rewind mode, by the rotation of the first loading ring 51.

Further, the present invention is not limited to these embodiments, but various variations and modifications may be made without departing from the scope of the present invention.

What is claimed is:

1. An automatic tape loading type recording and/or reproducing apparatus having a plurality of modes and being set to one of the modes at one time, said recording and/or reproducing apparatus comprising:

a guide-drum having at least a pair of heads for recording and/or reproducing an information signal onto and/or from a tape;

tape guide means for drawing the tape out of a tape cassette which is loaded within the apparatus while said guide means moves to a predetermined position, and for guiding the tape in a predetermined tape path so that the tape is wrapped around a peripheral surface of said guide drum when said guide means is in said predetermined position;

a supply reel disc and a take-up reel disc for rotating reels of said tape cassette, said reels being respectively fitted over said supply and take-up reel discs when said tape cassette is loaded into the apparatus;

a pair of ring-shaped bodies being disposed so as to generally encompass said guide drum in a plan view and rotating to move said tape guide means, each of said pair of ring-shaped bodies assuming a rotational position depending on a set mode of the apparatus so that said pair of ring-shaped bodies move said tape guide means in one direction from an original position up to the predetermined position when each of said pair of ring-shaped bodies rotates from a first rotational position to a second rotational position and moving said tape guide means in a direction opposite to said one direction and back from the predetermined position to the original position when each of said pair of ring-shaped bodies rotates from the second rotational position to the first rotational position;

tape driving means for driving the tape in said predetermined tape path, said tape driving means being displaced to one of a plurality of predetermined positions so that said tape driving means drives the tape at a tape traveling speed and in a tape traveling direction depending on the set mode of the apparatus;

braking means for braking said supply reel disc and said tape-up reel disc, said braking means being displaced to assume one of operating and nonoperating positions depending on the set mode of the apparatus;

first control means responsive to the rotational position of said pair of ring-shaped bodies for displacing said tape driving means to one of said plurality of predetermined positions in correspondence with the set mode of the apparatus; and second control means responsive to the rotational position of said pair of ring-shaped bodies for displacing said braking means to one of the operating and nonoperating positions in correspondence with the set mode of the apparatus and further said tape driving means comprises a pinch roller which presses against a capstan with the tape pinched between the pinch roller and the capstan, and rotary bodies for making contact with said reel discs and for rotating said reel discs in a tape take-up direction, and said first control means comprises first cam means and second cam means, said first cam means being displaced due to a rotation of said pair of ring-shaped bodies and moving said pinch roller so that said pinch roller presses against said capstan, said second cam means being displaced by a displacement of said first cam means and moving said rotary bodies so that said rotary bodies make contact with said reel discs.

2. An apparatus as claimed in claim 1 in which one of said pair of ring-shaped bodies comprises an engaging part, and said first cam means comprises a rotary arm which is disposed within a rotating locus of said engaging part and is engaged with and rotated by said engaging part when the one of said pair of ring-shaped bodies rotates to said second position, a pinch roller support arm for supporting said pinch roller, and linking means for linking said rotary arm to said pinch roller support arm, said linking means rotating said pinch roller support arm in response to a rotation of said rotary arm.

3. An apparatus as claimed in claim 1 in which one of said pair of ring-shaped bodies comprises an engaging part, and said second cam means comprises a rotary arm which is disposed within a rotating locus of said engaging part and is engaged with and rotated by said engaging part when the one of said pair of ring-shaped bodies rotates to said second position, and a member which undergoes a displacement in response to a rotation of said rotary arm and causes one of said rotary bodies to make contact with said take-up reel disc.

4. An apparatus as claimed in claim 1 in which said braking means comprises a first braking member for braking said take-up reel disc and a second braking member for braking said supply reel disc, one of said pair of ring-shaped bodies comprises a first engaging part and a second engaging part, and said second control means comprises a first mechanism which is disposed within a rotating locus of said first engaging part and is engaged with and operated by said first engaging part to displace said first braking member to an inoperative position with respect to said take-up reel disc when the one of said pair of ring-shaped bodies rotates to said second position, and a second mechanism which is disposed within a rotating locus of said second engaging part and is engaged with and operated by said second engaging part to displace said second braking member to an unoperated position with respect to said supply reel disc when the one of said pair of ring-shaped bodies rotates to said second position.

5. An apparatus as claimed in claim 1 in which one of said pair of ring-shaped bodies comprises a groove into which a projection of said tape guide means fits, said groove comprises a first groove portion which extends in a diametral direction of the one of said pair of ring-shaped bodies and moves said tape guide means in response to a rotation of the one of said pair of ring-shaped bodies, and a second groove portion which extends in a circumferential direction of the one of said pair of ring-shaped bodies and makes the one of said pair of ring-shaped bodies rotatable independently of said tape guide means as said projection moves relatively along said second groove portion, and said apparatus further comprises third control means for moving a rotary body which moves the tape at a high speed to an operating position of the rotary body so that said take-up reel disc or said supply reel disc is rotatable at a high speed, by a use of the rotation of the one of said pair of ring-shaped bodies as the one of said pair of ring-shaped bodies rotates independently of said tape guide means from said first position toward said second position.

6. An apparatus as claimed in claim 1 in which said tape driving means comprises a pinch roller which presses against a capstan with the tape pinched between the pinch roller and the capstan, a first rotary body for making contact with said take-up reel disc and for rotating said take-up reel disc in a tape take-up direction at a low speed so as to take up the tape which is fed out by said capstan, and a second rotary body for selectively making contact with said supply reel disc and said take-up reel disc and for rotating said supply reel disc or said take-up reel disc in the tape take-up direction at a high speed, and said first control means comprises first cam means which is displaced due to a rotation of said pair of ring-shaped bodies toward said first position by a small angle from said second position for separating said pinch roller from said capstan, second cam means which is displaced due to a displacement of said first cam means for separating said first rotary body from said take-up reel disc, delay means for delaying the beginning of a displacement of said second means by a slight time delay from the beginning of the displacement of said first means, and third cam means which is displaced due to the rotation of said pair of ring-shaped bodies by the small angle for causing said second rotary body to make contact with said supply reel disc or said take-up reel disc after said first rotary body separates from said take-up reel disc.

7. An apparatus as claimed in claim 6 in which said delay means is constituted by a gap for allowing a play to be formed between said first cam means and said second cam means, and said gap has a predetermined length.

8. An apparatus as claimed in claim 4 which further comprises a tape tension detecting mechanism for detecting a tension in the tape in an operating state thereof, said tape tension detecting mechanism making contact with the tape and assuming the operating state while the tape is pinched and driven between said pinch roller and said capstan, and said first mechanism causes said tape tension detecting mechanism to assume a non-operating state when said first mechanism is engaged with and operated by said first engaging part.

* * * * *